(12) United States Patent
Slipenchuk et al.

(10) Patent No.: US 11,934,498 B2
(45) Date of Patent: Mar. 19, 2024

(54) METHOD AND SYSTEM OF USER IDENTIFICATION

(71) Applicant: Group IB, Ltd, Moscow (RU)

(72) Inventors: Pavel Vladimirovich Slipenchuk, Moscow (RU); Dmitrij Arkadevich Yankelevich, Moscow (RU)

(73) Assignee: GROUP IB, LTD, Moscow (RU)

( * ) Notice: Subject to any disclaimer, the term of this patent is extended or adjusted under 35 U.S.C. 154(b) by 526 days.

(21) Appl. No.: 17/171,078

(22) Filed: Feb. 9, 2021

(65) Prior Publication Data

US 2021/0182369 A1 Jun. 17, 2021

Related U.S. Application Data

(63) Continuation of application No. PCT/RU2019/000126, filed on Feb. 27, 2019.

(51) Int. Cl.
*G06F 21/31* (2013.01)
*G06F 3/0489* (2022.01)
*G06F 11/34* (2006.01)
*G06N 20/00* (2019.01)

(52) U.S. Cl.
CPC ............ *G06F 21/31* (2013.01); *G06F 3/0489* (2013.01); *G06F 11/3438* (2013.01); *G06N 20/00* (2019.01)

(58) Field of Classification Search
None
See application file for complete search history.

(56) References Cited

U.S. PATENT DOCUMENTS

| 7,225,343 | B1 | 5/2007 | Honig et al. |
| 7,496,628 | B2 | 2/2009 | Arnold et al. |
| 7,631,362 | B2 | 12/2009 | Ramsey |
| 7,712,136 | B2 | 5/2010 | Sprosts et al. |

(Continued)

FOREIGN PATENT DOCUMENTS

| CA | 2606326 A1 | 11/2006 |
| CN | 103491205 A | 1/2014 |

(Continued)

OTHER PUBLICATIONS

Russian Search Report dated Mar. 2, 2023 issued in respect of the related Russian Patent Application No. RU 2019111675.

(Continued)

*Primary Examiner* — Brandon Hoffman
(74) *Attorney, Agent, or Firm* — BCF LLP

(57) ABSTRACT

A method and an electronic device for training a classifier to identify a user of the electronic device are provided. The method comprises: receiving training key stroke data associated with the user, a given portion of the training key stroke data having been generated in response to the user inputting a respective symbol of a predetermined text into the electronic device, by interacting with a given key of the plurality of keys; determining, based on the given portion of the training key stroke data, a plurality of time intervals associated with the user; determining most stable ones of the plurality of time intervals for inclusion thereof in a training set of data; training, based on the training set of data, the classifier to determine if the predetermined text inputted into the electronic device in future has been inputted by the user.

16 Claims, 4 Drawing Sheets

(56) References Cited

U.S. PATENT DOCUMENTS

| Patent/Publication | Date | Inventor(s) |
|---|---|---|
| 7,730,040 B2 | 6/2010 | Reasor et al. |
| 7,865,953 B1 | 1/2011 | Hsieh et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,600,993 B1 | 12/2013 | Gupta et al. |
| 8,606,725 B1 | 12/2013 | Agichtein et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,776,229 B1 | 7/2014 | Aziz |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,185,095 B1 | 11/2015 | Moritz et al. |
| 9,210,111 B2 | 12/2015 | Chasin et al. |
| 9,215,239 B1 | 12/2015 | Wang et al. |
| 9,253,208 B1 | 2/2016 | Koshelev |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,590,986 B2 | 3/2017 | Zizi et al. |
| 9,654,593 B2 | 5/2017 | Garg et al. |
| 9,723,344 B1 | 8/2017 | Granström et al. |
| 9,736,178 B1 | 8/2017 | Ashley |
| 9,917,852 B1 | 3/2018 | Xu et al. |
| 9,934,376 B1 | 4/2018 | Ismael |
| 2002/0112048 A1 | 8/2002 | Gruyer et al. |
| 2002/0161862 A1 | 10/2002 | Horvitz |
| 2003/0009696 A1 | 1/2003 | Bunker et al. |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0101155 A1 | 5/2007 | Hoghaug et al. |
| 2007/0239999 A1 | 10/2007 | Honig et al. |
| 2008/0222712 A1 | 9/2008 | O'Connell et al. |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2013/0343616 A1 | 12/2013 | Forero et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0169854 A1 | 6/2015 | Chang et al. |
| 2015/0170312 A1 | 6/2015 | Mehta et al. |
| 2015/0200963 A1 | 7/2015 | Geng et al. |
| 2015/0220735 A1 | 8/2015 | Paithane et al. |
| 2015/0295945 A1 | 10/2015 | Canzanese et al. |
| 2015/0310196 A1 | 10/2015 | Turgeman et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0112445 A1 | 4/2016 | Abramowitz |
| 2016/0127907 A1 | 5/2016 | Baxley et al. |
| 2016/0149943 A1 | 5/2016 | Kaloroumakis et al. |
| 2016/0171197 A1 | 6/2016 | Song et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0307201 A1 | 10/2016 | Turgeman et al. |
| 2016/0359679 A1 | 12/2016 | Parandehgheibi et al. |
| 2017/0032250 A1 | 2/2017 | Chang |
| 2017/0034211 A1 | 2/2017 | Buergi et al. |
| 2017/0111377 A1 | 4/2017 | Park et al. |
| 2017/0134401 A1 | 5/2017 | Medvedovsky et al. |
| 2017/0140279 A1 | 5/2017 | Turgeman |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0221064 A1 | 8/2017 | Turgeman et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0268464 A1 | 9/2018 | Li |
| 2018/0307832 A1 | 10/2018 | Ijiro et al. |
| 2018/0309787 A1 | 10/2018 | Evron et al. |
| 2018/0322287 A1 | 11/2018 | Zhao et al. |
| 2019/0089737 A1 | 3/2019 | Shayevitz et al. |
| 2019/0207973 A1 | 7/2019 | Peng |
| 2019/0373005 A1 | 12/2019 | Bassett |

(56) References Cited

U.S. PATENT DOCUMENTS

| | | | |
|---|---|---|---|
| 2020/0134702 A1 | 4/2020 | Li | |
| 2020/0244639 A1* | 7/2020 | Arif Khan | G06N 20/10 |

FOREIGN PATENT DOCUMENTS

| | | | | |
|---|---|---|---|---|
| CN | 104504307 | A | 4/2015 | |
| CN | 105429956 | A | 3/2016 | |
| CN | 105897714 | A | 8/2016 | |
| CN | 106131016 | A | 11/2016 | |
| CN | 106202482 | A | 12/2016 | |
| CN | 106355450 | A | 1/2017 | |
| CN | 106506435 | A | 3/2017 | |
| CN | 106713312 | A | 5/2017 | |
| CN | 107392456 | A | 11/2017 | |
| EP | 1160646 | A2 | 12/2001 | |
| EP | 2410452 | B1 | 1/2016 | |
| EP | 2477136 | B1 | 4/2018 | |
| GB | 2437100 | A * | 10/2007 | G06F 21/316 |
| GB | 2437100 | A | 10/2007 | |
| GB | 2470579 | A | 12/2010 | |
| GB | 2493514 | A | 2/2013 | |
| KR | 10-2007-0049514 | A | 5/2007 | |
| KR | 20090022682 | A | 3/2009 | |
| KR | 100923179 | B1 | 10/2009 | |
| KR | 10-1514984 | B1 | 4/2015 | |
| KR | 20190018197 | A | 2/2019 | |
| RU | 2333532 | C2 | 9/2008 | |
| RU | 2382400 | C2 | 2/2010 | |
| RU | 107616 | U1 | 8/2011 | |
| RU | 2446459 | C1 | 3/2012 | |
| RU | 129279 | U1 | 6/2013 | |
| RU | 2487406 | C1 | 7/2013 | |
| RU | 2488880 | C1 | 7/2013 | |
| RU | 2495486 | C1 | 10/2013 | |
| RU | 2522019 | C1 | 7/2014 | |
| RU | 2523114 | C2 | 7/2014 | |
| RU | 2530210 | C2 | 10/2014 | |
| RU | 2536664 | C2 | 12/2014 | |
| RU | 2538292 | C1 | 1/2015 | |
| RU | 2543564 | C1 | 3/2015 | |
| RU | 2566329 | C2 | 10/2015 | |
| RU | 2571594 | C2 | 12/2015 | |
| RU | 2589310 | C2 | 7/2016 | |
| RU | 164629 | U1 | 9/2016 | |
| RU | 2607231 | C2 | 1/2017 | |
| RU | 2610586 | C2 | 2/2017 | |
| RU | 2613535 | C1 | 3/2017 | |
| RU | 2622870 | C2 | 6/2017 | |
| RU | 172497 | U1 | 7/2017 | |
| RU | 2625050 | C1 | 7/2017 | |
| RU | 2628192 | C2 | 8/2017 | |
| RU | 2636702 | C1 | 11/2017 | |
| RU | 2649793 | C2 | 4/2018 | |
| RU | 2670030 | C2 | 10/2018 | |
| RU | 2670906 | C9 | 12/2018 | |
| RU | 2681699 | C1 | 3/2019 | |
| WO | 0245380 | A2 | 6/2002 | |
| WO | 2009/026564 | A1 | 2/2009 | |
| WO | 2011/045424 | A1 | 4/2011 | |
| WO | 2011039371 | A1 | 4/2011 | |
| WO | 2012/015171 | A2 | 2/2012 | |
| WO | 2017070600 | A1 | 4/2017 | |
| WO | 2019/010182 | A1 | 1/2019 | |
| WO | 2019/035491 | A1 | 2/2019 | |

OTHER PUBLICATIONS

International Search Report and Written Opinion with regard to the counterpart Patent Application No. PCT/RU2019/000126 dated Nov. 28, 2019.
English Abstract for KR100923179 retrieved on Espacenet on Dec. 3, 2020.
English Abstract for KR20090022682 retrieved on Espacenet on Dec. 3, 2020.
English Abstract for KR20190018197 retrieved on Espacenet on Dec. 3, 2020.
Wikipedia, "Keystroke dynamics", https://en.wikipedia.org/wiki/Keystroke_dynamics, accessed on Jan. 4, 2021, pdf 3 pages.
Wikipedia, "Feature extraction", https://en.wikipedia.org/wiki/Feature_extraction, accessed on Jan. 4, 2021, pdf 7 pages.
Wikipedia, "Scancode", ru.wikipedia.org/w/index.php?title=%D0%A1%D0%BA%D0%B0%D0%BD%D0%BA%D0%BE%D0%B4&oldid=98124315, accessed on Feb. 8, 2021, pdf 9 pages.
Office Action with regard to the counterpart U.S. Appl. No. 16/194,578 dated Feb. 18, 2022.
Brownlee, Jason "How To Implement The Decision Tree Algorithm From Scratch In Python" (Year: 2016).
English Abstract of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions On Fundamentals of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
English Translation of CN106713312, © Questel—FAMPAT, Jul. 17, 201.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.

(56) References Cited

OTHER PUBLICATIONS

English Translation of CN106131016, © Questel—FAMPAT, Jul. 17, 2019.
Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.
Office Action with regard to the counterpart U.S. Appl. No. 15/707,641 dated Apr. 25, 2019.
International Search Report with regard to the counterpart Patent Application No. PCT/RU2019/000232 dated Jan. 9, 2020.
English Abstract for CN106355450 retrieved on Espacenet on Jan. 4, 2021.
English Abstract for CN106202482 retrieved on Espacenet on Jan. 4, 2021.
Wikipedia, "Focus (computing)", https://en.wikipedia.org/wiki/Focus_(computing), accessed on Jan. 4, 2021, pdf 5 pages.
Wikipedia, "Collaborative software", https://en.wikipedia.org/wiki/Collaborative_software, accessed on Jan. 4, 2021, pdf 11 pages.
International Search Report with regard to the Patent Application No. PCT/RU2019/000169 dated Dec. 5, 2019.
Search Report with regard to RU Patent Application No. 2019107535 completed Dec. 13, 2022.
English Description and Claims for RU2333532 retrieved on Espacenet on Dec. 28, 2022.
English Abstract for RU172497 retrieved on Espacenet on Dec. 28, 2022.
Notice of Allowance with regard to the counterpart U.S. Appl. No. 15/858,013 dated Jun. 10, 2020.
Office Action with regard to the counterpart U.S. Appl. No. 16/270,341 dated May 27, 2020.
Notice of Allowance with regard to the counterpart U.S. Appl. No. 15/858,013 dated May 8, 2020.
Office Action received with regard to the counterpart U.S. Appl. No. 15/858,032 dated Apr. 6, 2020.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Office Action with regard to the counterpart U.S. Appl. No. 15/858,013 dated Nov. 22, 2019.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year: 2005)—cited by Examiner in the Notice of Allowance with regard to the counterpart U.S. Appl. No. 15/707,641.
Office Action with regard to the counterpart U.S. Appl. No. 16/261,854 dated Oct. 21, 2019.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action issued in respect of the related U.S. Appl. No. 16/194,578 dated Oct. 12, 2022.

* cited by examiner

METHOD AND SYSTEM OF USER IDENTIFICATION

CROSS-REFERENCE

The present application is a continuation of International Patent Application no. PCT/RU2019/000126, entitled "METHOD AND SYSTEM FOR IDENTIFYING A USER ACCORDING TO KEYSTROKE DYNAMICS," filed on Feb. 27, 2019, the entirety of which is incorporated herein by reference.

FIELD

The present technology relates broadly to the field of cybersecurity, and in particular, to a method and system for identifying a user of an electronic device.

BACKGROUND

Protecting information from unauthorized access is becoming increasingly important. Reliable results may be obtained using biometric authentication methods, which includes, for example: voice recognition; face recognition; iris recognition; and fingerprint recognition.

In addition, a given user's keystroke dynamics (also referred to herein as "Keystroke Dynamics", "keystroke biometrics", and "typing dynamics", for more information see: en.wikipedia.org/wiki/Keystroke_dynamics) may be used for user identification thereof. Wherein, the use of keystroke dynamics recognition may have several advantages over the other authentication methods. First, using the keystroke dynamics for user identification tasks may not require additional equipment, resulting in a lower cost of implementing such a an authentication method. Second, monitoring of keystroke dynamics can be performed continuously and imperceptibly for the given user, without distracting their attention from a process of interacting with an electronic device.

As it may be appreciated, the keystroke dynamics associated with the given user may be indicative of a number of physiological, psychological and other characteristics of the given user, expressed during working on a computer keyboard in various time intervals between elementary actions (pressing and releasing keys).

Certain prior approaches have been proposed to implement use of the key stroke dynamics for user identification tasks.

PCT Application Publication No.: WO 2011/039,371-A1 published on Apr. 7, 2011 and entitled "Crosswise Alignment of Typing Behaviour for Authenticating and/or Identifying a Person" discloses a method for authenticating and/or identifying a person using the typing behaviour on a keyboard and also to a corresponding apparatus, wherein the method comprises: —registration of a person, which involves at least one registration typing sample being captured and being stored under an identifier, —creation of a registration profile on the basis of the registration typing sample submitted during registration, and storage of the registration profile under the identifier, —submission of at least one logon typing sample during logon for authentication and/or identification purposes, —creation of a logon profile on the basis of the logon typing sample submitted during logon, and—crosswise alignment of the logon typing sample with the registration profile and of the registration typing sample with the logon profile.

Great Britain Patent Application Publication No.: 2,470,579-A published on Dec. 1, 2010, assigned to University of Abertay Dundee, and entitled "A Behavioural Biometric Security System Using Keystroke Metrics" discloses a behavioral biometric system using keystroke metrics a way of granting a user access to a system. In use a plurality of test keyboard metrics are generated from a received identity verification request (24). A typing pattern expressed in the test keyboard metrics (26) is then compared with one or more stored keyboard metrics from a plurality of registered users (28). If no match is found the user is refused access (31) otherwise the closest registered user is identified (32). A second comparison (32) of the received keystroke metrics is then made with one or more stored metrics associated with a user in a normally stressed state. Access to the controlled resource is only allowed when a substantial match is found (36). The metrics used may include inter key latency, hold time or typing error. Metrics for a more stressed state of the user may be stored. These may be recorded by manipulating the emotional state of the user using a number of stimuli such as the International Affective Digitized Sounds (IADS) and/or measuring the Galvanic skin response of the user. The system and method may be used as part of an ATM, door entry system or a portable wireless device.

U.S. Pat. No. 9,590,986-B2 issued on Mar. 7, 2017, assigned to Proprius Technologies SARL, and entitled "Local User Authentication with Neuro and Neuro Mechanical Fingerprints" discloses a method for locally verifying the identification of a user with an electronic device. The method includes regenerating a neuro-mechanical fingerprint (NFP) in response to a micro-motion signal sensed at a body part. In response to a plurality of authorized user calibration parameters, a match percentage of the neuro-mechanical fingerprint is determined. The match percentage is determined without the use of a calibration NFP that was previously used to generate the user calibration parameters. Access to the electronic device and its software applications is then controlled by the match percentage. If the match percentage is greater than or equal to an access match level, access to the electronic device is granted. If the match percentage is less than the access match level, access is denied. Subsequent access requires further regeneration of the NFP and a determination of its match percentage in response.

PCT Application No.: WO 2017/070,600-A1 published on Apr. 27, 2017 and entitled "System and Method for Authenticating a User through Unique Aspects of the User's Keyboard of Typing Cadence Data" discloses a system and method for authenticating a user through unique aspects of the user's keyboard or using typing cadence data. The system and method measure particular aspects of the keyboard performance, which identifies each keyboard uniquely or captures typing cadence data. Thus, the proper keyboard used when logging in to a service or a network can be authenticated.

United States Patent Application Publication No.: 2015/169,854-A1 published on Jun. 18, 2015, assigned to Iowa State University Research Foundation ISURF, and entitled "Capturing Cognitive Fingerprints from Keystroke Dynamics for Active Authentication" discloses a method for authenticating identity of a user using keystrokes of the user including receiving as input the keystrokes made by the user, extracting cognitive typing rhythm from the keystroke to provide features, wherein each of the features is a sequence of digraphs of a specific word, and providing active authentication using the features where the user is a legitimate user. A system for authenticating identity of a user using keystrokes of the user includes a plurality of stored profiles stored on a non-transitory computer readable medium, a sensor module for acquiring the keystrokes of the user to provide biometric data, a feature extraction module to process the biometric data and extract a feature set to represent the biometric data, a matching module to compare feature from the feature set with the stored profiles using a classifier to generate matching scores, a decision module configured to use the matching scores from multiple classifiers to verify a user's identity.

SUMMARY

It is an object of the present technology to ameliorate at least some inconveniences noted in the prior art approaches.

Developers of the present technology have realized that human fingers can be considered as an extremely complex system that has an ability to adapt to external circumstances; and, in different circumstances, the time required for some elementary action, for example, pressing a certain key, can thus be different and can depend on what other elementary actions needed to be performed before and after this action.

On the other hand, computer keyboards, typically, have similar but different physical parameters, such as the distances between adjacent keys, the height of the keyboard, its angle of inclination relative to the table, the hardness of the key, etc. Due to the above facts, keystroke dynamics may be different not only for different people, but also for the same person typing text using different keyboards.

Therefore, the developers of the present technology have appreciated that user identification based on the key stroke dynamics may allow for more accurate results if various specific time interval associated with the given user interacting with respective keys of the keyboard are considered. Such time intervals may include, for example, a time interval between pressing two sequentially used keys for inputting a predetermined text (such as their login/password); a time interval between releasing two sequentially used keys, and possible combinations thereof.

The developers believe that the methods and systems described herein are directed to a more comprehensive approach to determining user's key stroke dynamics for user identification tasks, unlike the methods noted in the above prior art references, and thus the present methods and systems allow for more effective identification of violators having gained access to private data of users.

More specifically, in accordance with a first broad aspect of the present technology, there is provided a method of training a classifier to identify a user of an electronic device. The method is executable by a processor of the electronic device including a keyboard having a plurality of keys. The method comprising: in a training phase: receiving, by the processor, training key stroke data associated with the user, a given portion of the training key stroke data having been generated in response to the user interacting with a given key of the plurality of keys used for inputting a predetermined text into the electronic device; determining, by the processor, based on the given portion of the training key stroke data, a plurality of time intervals including: a first time interval, during which the given key is pressed; a plurality of second time intervals between respective moments of pressing the given key and pressing each one of those of the plurality of keys used for inputting the predetermined text; a plurality of third time intervals between respective moments of releasing the given key and releasing each one of those of the plurality of keys used for inputting the predetermined text; a plurality of fourth time intervals between respective moments of pressing the given key and releasing each one of the those of the plurality of used for inputting the predetermined text; plurality of fifth time intervals between respective moments of releasing the given key and pressing each one of those of the plurality of keys used for inputting to the predetermined text; determining, for a given one of the plurality of time intervals, based on a plurality of instances of inputting, by the user, the predetermined text, a respective variance value; ranking, by the processor, the plurality of time intervals in accordance with respective variance values associated therewith, thereby generating a ranked list of time intervals; selecting, by the processor, from the ranked list of time intervals, a predetermined number of top time intervals for inclusion thereof in a training set of data; the predetermined number of top time intervals being associated with a user identifier indicative of an association between the predetermined number of top time intervals and the user; training, by the processor, based on the training set of data, the classifier to determine if the predetermined text inputted into the electronic device in future has been inputted by the user.

In some implementations of the method, the method further comprises using the classifier, by executing, in an in-use phase following the training phase: receiving, by the processor, in-use key stroke data, each portion of the in-use key stroke data having been generated in response to interacting with a respective key of the plurality of keys used for inputting the predetermined text into the electronic device; receiving, for each portion of the in-use key stroke data, a respective timestamp indicative of a time of generating a respective portion of the in-use key stroke data; aggregating, by the processor, each portion of the in-use key stroke data with the respective timestamp, thereby generating an in-use set of data; applying, by the processor, the classifier to the in-use set of data to determine a likelihood parameter indicative of whether the predetermined text has been inputted by the user or not, wherein: in response to the likelihood parameter being equal to or greater than a predetermined threshold value, determining that the predetermined text has been inputted by the user; in response to the likelihood parameter being lower than the predetermined threshold value, determining that the predetermined text has been inputted not by the user.

In some implementations of the method, in response to the determining that the predetermined text has been inputted not by the user, the method further comprises generating, by the processor, a predetermined message.

In some implementations of the method, the given one of the plurality of keys is a non-symbolic key used during the inputting the predetermined text.

In some implementations of the method, the keyboard is divided into predetermined operation areas, each of which includes a respective sub-plurality of keys of the plurality of keys.

In some implementations of the method, each of the predetermined operation zones of the keyboard is associated with a respective predetermined weight value assigned to each one of the respective sub-plurality of keys including the given key, and the method further comprises: assigning, by the processor, the respective predetermined weight value to each one of the plurality of time intervals.

In some implementations of the method, the training the classifier includes applying, by the processor, one or more machine learning algorithms.

In some implementations of the method, the user comprises a plurality of users, and the given one of the plurality time intervals is associated with a group user identifier indicative of an association between the given one of the plurality time intervals and each one of the plurality of users.

In accordance with a second broad aspect of the present technology, there is provided an electronic device for training a classifier to identify a user of the electronic device. The electronic device comprises: a processor; a non-transitory computer-readable medium comprising instructions; and a keyboard including a plurality of keys. The processor, upon executing the instructions, is configured to: in a training phase: receive training key stroke data associated with the user, a given portion of the training key stroke data having been generated in response to the user interacting with a given key of the plurality of keys used for inputting a predetermined text into the electronic device; determine, based on the given portion of the training key stroke data, a plurality of time intervals including: a first time interval, during which the given key is pressed; a plurality of second time intervals between respective moments of pressing the given key and pressing each one of those of the plurality of keys used for inputting the predetermined text; a plurality of third time intervals between respective moments of releasing the given key and releasing each one of those of the plurality of keys used for inputting the predetermined text; a plurality of fourth time intervals between respective moments of pressing the given key and releasing each one of the those of the plurality of used for inputting the predetermined text; a plurality of fifth time intervals between respective moments of releasing the given key and pressing each one of those of the plurality of keys used for inputting to the predetermined text; determine, for a given one of the plurality of time intervals, based on a plurality of instances of inputting, by the user, the predetermined text, a respective variance value; rank, by the processor, the plurality of time intervals in accordance with respective variance values associated therewith, thereby generating a ranked list of time intervals; select, from the ranked list of time intervals, a predetermined number of top time intervals for inclusion thereof in a training set of data; the predetermined number of top time intervals being associated with a user identifier indicative of an association between the predetermined number of top time intervals and the user; train, based on the training set of data, the classifier to determine if the predetermined text inputted into the electronic device in future has been inputted by the user.

In some implementations of the electronic device, the processor is further configured to use the classifier, by executing, in an in-use phase following the training phase: receiving in-use key stroke data, each portion of the in-use key stroke data having been generated in response to interacting with a respective key of the plurality of keys used for inputting the predetermined text into the electronic device; receiving, for each portion of the in-use key stroke data, a respective timestamp indicative of a time of generating a respective portion of the in-use key stroke data; aggregating each portion of the in-use key stroke data with the respective timestamp, thereby generating an in-use set of data; applying the classifier to the in-use set of data to determine a likelihood parameter indicative of whether the predetermined text has been inputted by the user or not, wherein: in response to the likelihood parameter being equal to or greater than a predetermined threshold value, determining that the predetermined text has been inputted by the user; in response to the likelihood parameter being lower than the predetermined threshold value, determining that the predetermined text has been inputted not by the user. The electronic device of claim 10, wherein in response to the determining that the predetermined text has been inputted not by the user, the processor is further configured to generate a predetermined message.

In some implementations of the electronic device, the given one of the plurality of keys is a non-symbolic key used during the inputting the predetermined text.

In some implementations of the electronic device, the keyboard is divided into predetermined operation areas, each of which includes a respective sub-plurality of keys of the plurality of keys.

In some implementations of the electronic device, each of the predetermined operation zones of the keyboard is associated with a respective predetermined weight value assigned to each one of the respective sub-plurality of keys including the given key, and the processor is further configured to: assign the respective predetermined weight value to each one of the plurality of time intervals.

In some implementations of the electronic device, to train the classifier the processor is configured to apply one or more machine learning algorithms.

In some implementations of the electronic device, the user comprises a plurality of users, and the training set of data is associated with a group user identifier indicative of an association between the training set of data and the plurality of users.

In the context of the present specification, unless expressly provided otherwise, a computer system may refer, but is not limited to, a "computing device", an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology will be described with reference to the accompanying drawings, which are presented to explain the essence of the invention and in no way to limit the scope of the present technology, wherein.

DETAILED DESCRIPTION

Figure 1:
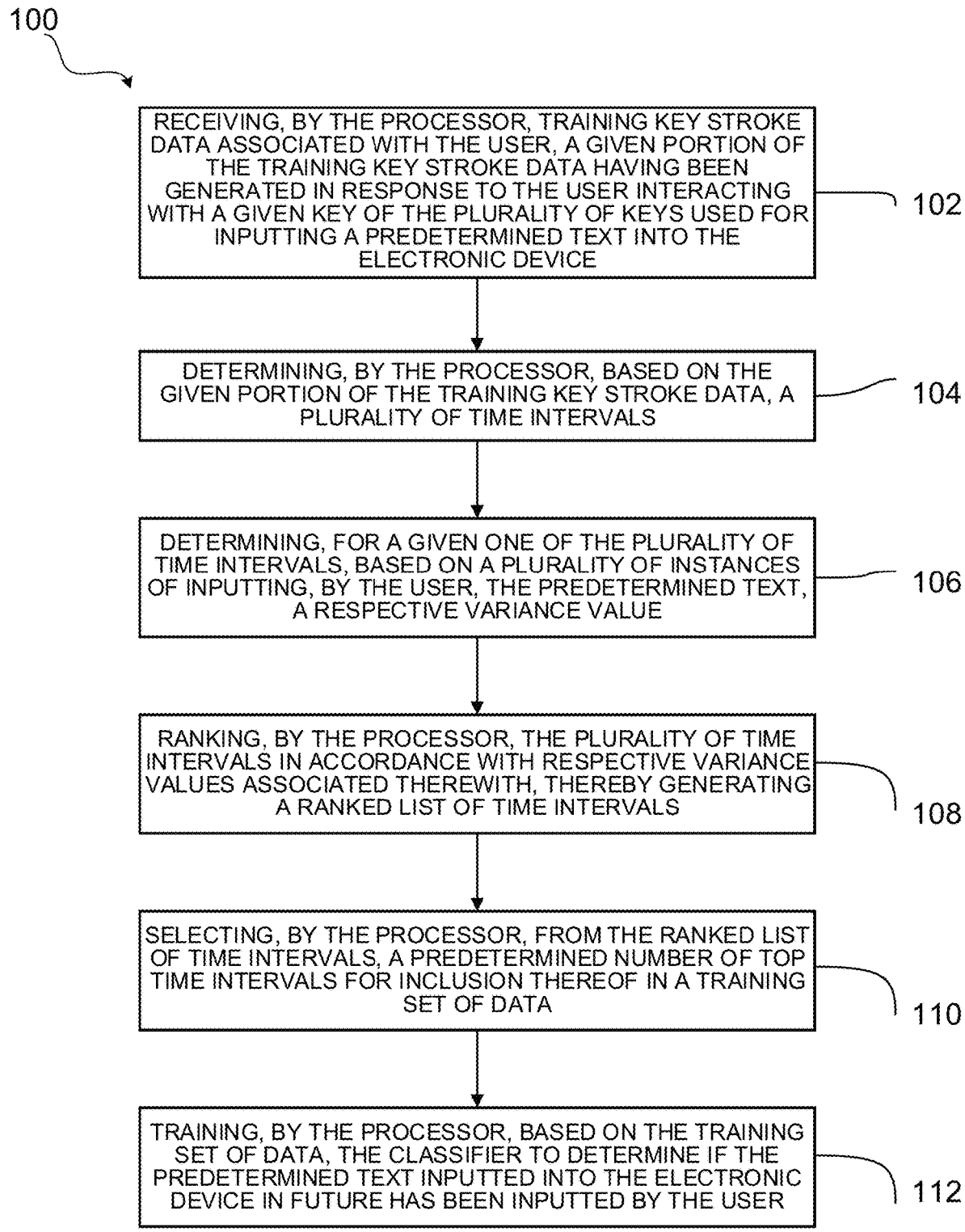
FIG. 1 depicts a flow chart of a computer-implemented method of training a classifier to identify a user of an electronic device, in accordance with certain non-limiting embodiments of the present technology.

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to methods and systems for training a classifier to identify a user of an electronic device by key stroke dynamics thereof and using the so trained classifier for identifying the user.

According to some non-limiting embodiments of the present technology, the electronic device may include, without limitation, a personal computer, a smartphone, a tablet, and the like. As such, the electronic device may include a keyboard comprising a plurality of keys, using which the user may input a text to the electronic device. Thus, by eliciting data indicative of the key stroke dynamics associated with the user from the inputted text, the present methods and systems may allow for training the classifier to identify the user, as will be described below.

Further, for executing certain computational tasks, the electronic device may include a computing environment, such as a computing environment 400 including a processor 401, which will be described further below with reference to FIG. 4.

Certain non-limiting embodiments of the present technology are based on a premise that an electronic signal generated by the keyboard in response to pressing or releasing a given key uniquely identifies the given key. Moreover, this electronic signal neither depends on how hard the key was pressed, nor on how quickly it was pressed, nor on how long it was held down before releasing, nor on other similar factors.

According to some non-limiting embodiments of the present technology, an output of the keyboard, that is, data generated and received by the electronic device in response to interacting with the given key of the keyboard, may comprise a set of so-called scan codes (for more detail see ru.wikipedia.org/w/index.php?title=%D0%A1%D0%BA%D0%B0%D0%BD-%D0%BA%D0%BE%D0%B4&oldid=98124315) successively transmitted in a digital (binary) form to the electronic device through a port to which the keyboard is coupled to the electronic device. Each of these scan codes uniquely identifies a respective key. Further each of these scan codes may be indicative of a particular type of interaction with the respective key. Thus, for example, for the given key, there may be predetermined, in the electronic device, a scan code of pressing, and a scan code of releasing it.

It should be noted that the scan codes are unique within a specific computer configuration of the electronic device and they can be transmitted from the keyboard to electronic device regardless of the state of the other input devices thereof.

As a result, once the given has been pressed, for example, the processor 401 may be configured to receive: (1) a time of pressing, (2) a time of releasing, (3) information about the given key—what command/character is associated therewith, as an example. To that end, in some non-limiting embodiments of the present technology, the processor 401 may have access to system clock data provided, for example, by an operating system of the electronic device, and may thus be enabled to determine a timestamp a specific between the time of pressing and the releasing of the given key.

In some non-limiting embodiments of the present technology, the processor 401 may be configured to determine the key stroke dynamics of the user based on the user inputting a predetermined text to the electronic device. Such a predetermined text may include, for example, user credentials, such as their username and password.

For example, before starting work on the electronic device, the user can be informed of their credentials and instructed to enter a username and password a predetermined number of times (such as 10-15 times) in a respective user interface window provided by the electronic device. The predetermined number of times of inputting the predetermined text for each user may be different, since it depends not only on the experience of a specific user with the keyboard, but also on their "degree of acquaintance" with a specific keyboard.

In alternative non-limiting embodiments of the present technology, the electronic device may include a server of a remote computer system including, for example, a remote banking service system or an online store site that has a personal account function and includes a customer authorization feature. In these embodiments, the user may be asked to enter their credentials in a browser window associated with the remote computer system, and the processor 401 may be configured to receive the data from the user remotely, as will be described below.

Method

With reference to FIG. 1, there is depicted a flowchart diagram of a method 100 of training the classifier to identify the user of the electronic by the keystroke dynamics associated therewith, in accordance with certain non-limiting embodiments of the present technology. The method 100 may be executed by the processor 401 of the electronic device.

Step 102: Receiving, by the Processor, Training Key Stroke Data Associated with the User, a Given Portion of the Training Key Stroke Data Having been Generated in Response to the User Interacting with a Given Key of the Plurality of Keys Used for Inputting a Predetermined Text into the Electronic Device The method 100 commences at step (102) with the processor 401 being configured to receive training key stroke data generated by the electronic device in response to the user entering the user credentials. As it can be appreciated, the training key stroke data may include a set of scan codes of keys of the keyboard, with which the user has interacted to input the user credentials.

In some non-limiting embodiments of the present technology, the processor 401 can also be configured to obtain and assign to the training key stroke data a user identifier associated with the user credentials. According to certain non-limiting embodiments of the present technology, the user identifier may be used by the processor 401 to uniquely identify the user in the computer system in each working session. For example, the user identifier may include an arbitrary pseudonym ("Ivanov.I.I."), which may not coincide with the login entered by the user upon a request of the computer system at the beginning of training, as well as a pseudo-random number, for example, a hash function value of a system time received, by the processor 401, at the time of pressing the first key when entering the password with an accuracy of 0.001 seconds for the first time, can be used as the user identifier of the user, in some non-limiting embodiments of the present technology.

In alternative non-limiting embodiments of the present technology, the user identifier of the user can include a respective user_id, assigned to the user by the computer system including, for example, the remote banking service (RBS) system.

In order to further reduce the probability of data loss, in response to receiving the correct user credentials and having associated the user_id of the user with a given user session, the processor 401 can further be configured to apply a predetermined a hash function from the user_id and use the resulting value as the user identifier. Thus, it should be noted that it is not limited how the processor 401 is configured to obtain the user identifier.

The method 100 thus proceeds to step 104.

Step 104: Determining, by the Processor, Based on the Given Portion of the Training Key Stroke Data, a Plurality of Time Intervals Further, at step (104), the processor 401 can be configured to determine, for a given portion of the training key stroke data generated in response to the user interaction with a given key used for inputting the user credentials into the electronic device, a plurality of time intervals. According to certain non-limiting embodiments of the present technology, the plurality of time intervals may be indicative of user-specific fashion of interacting with the given key when entering the user credentials.

In some non-limiting embodiments of the present technology, the plurality of time intervals may include:
a time interval during which the given key was held down;
time intervals between respective moments in time of pressing the given key and pressing all other keys that are used by the user when entering the user credentials;
time intervals between respective moments in time of releasing the given key and releasing all the other keys that are used by the user when entering the user credentials;
time intervals between respective moments in time of pressing the given key and releasing all the other keys that are used by the user when entering the user credentials;
time intervals between respective moments in time of releasing the given key and pressing all the other keys that are used by the user when entering the user credentials.

Thus, in some non-limiting embodiments of the present technology, the processor 401 may be configured to store respective pluralities of time intervals associated with each of the plurality of keys used, by the user, for inputting the user credentials. Further, the processor 401 may be configured to use the respective pluralities of time intervals for generating a training set of data as will be described below.

Figure 2:
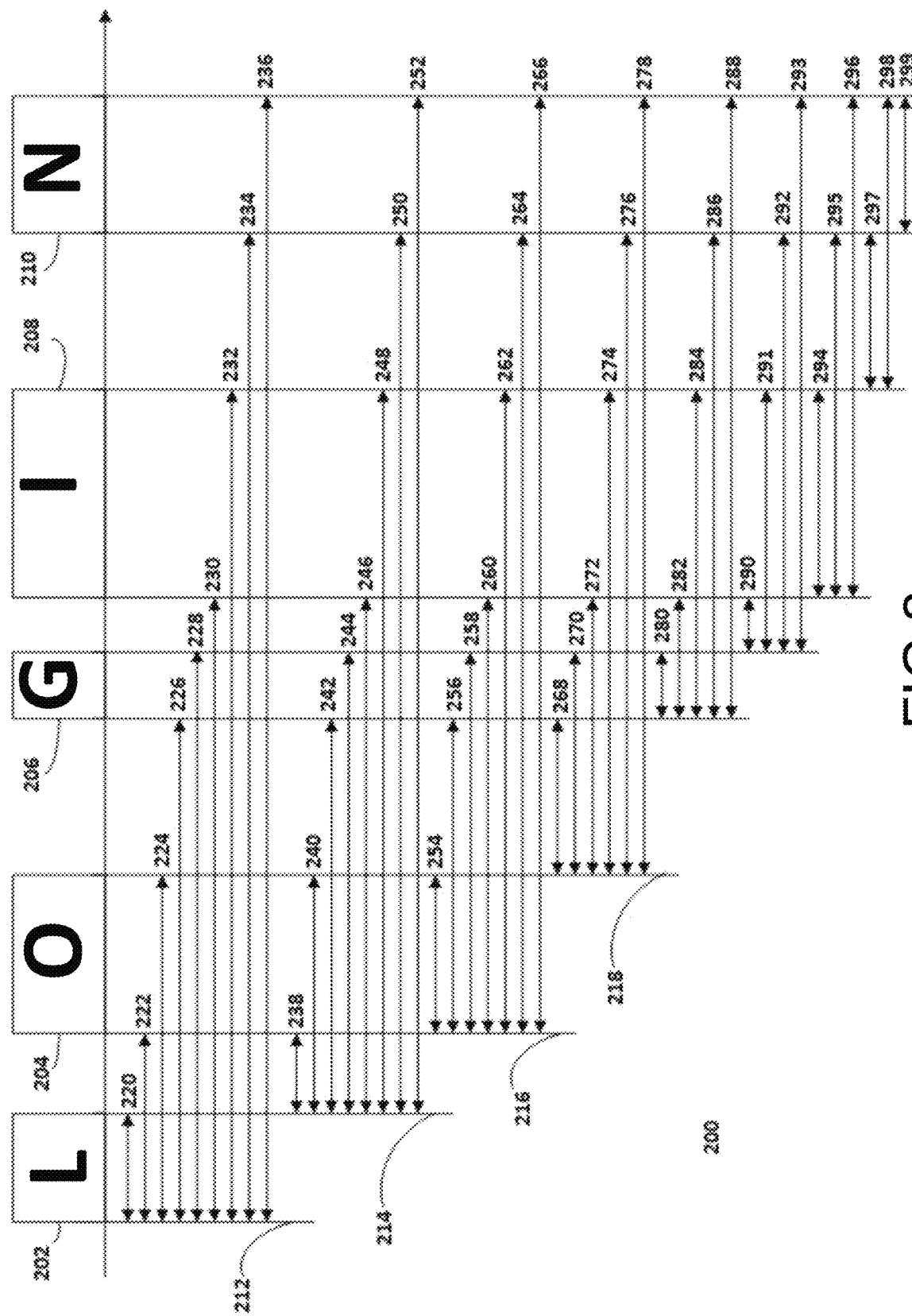
FIG. 2 depicts a schematic diagram of determining a plurality of time intervals associated with interacting with keys of a keyboard used for training the classifier in accordance with the method of FIG. 1, in accordance with certain non-limiting embodiments of the present technology.

With reference to FIG. 2, there is depicted a schematic diagram of an example of the processor 401 determining time intervals in response to inputting the word "LOGIN", in accordance with certain non-limiting embodiments of the present technology.

As it can be appreciated, the processor 401 can be configured to determine a set of time intervals 200, in response to user interaction with a sequence of keys L 202, O 204, G 206, I 208 and N 210 of the keyboard. The processor 401 may be configured to determine the time of pressing using the system clock data for each of these keys, for example, a first time of pressing 212 of the L 202 key or a second time of pressing 216 of the O 204 key. Further, the processor 401 may be configured to determine the time of key releasing also using the system clock for each of these keys, for example, a first time of releasing 214 of the L 202 key or a second time of releasing 218 of the O 204 key.

Further, in some non-limiting embodiments of the present technology, the processor 401 may be configured to determine the hold time of each key in the pressed state, such as: a first hold time 220 of the L 202 key, a second hold time 254 of the O 204 key, a third hold time 280 of the G 206 key, a fourth hold time 294 of the I 208 key, and a fifth hold time 299 of the N 210 key.

Further, the processor 401 may be configured to determine a first subset of time intervals between the times of pressing each key and pressing all the other keys used for inputted the word "LOGIN". More specifically, first, the processor 401 can be configured to determine time intervals 222, 226, 230 and 234 associated with the L 202 key between the first time of pressing 212 of the L 202 key and respective times of pressing of the O 204, G 206, I 208 and N 210 keys. Further, for the O 204 key, the processor 401 can be configured to determine time intervals 256, 260 and 264 between the second time of pressing 216 of the O 204 key and respective times of pressing the G 206, I 208, and N 210 keys. A time interval 222 between pressing L 202 and O 204 keys is not determined in this case, since it has already been determined earlier. Similar, time intervals 282 and 286 between respective moments of pressing of the G 206 key and pressing the I 208 and N 210 keys are determined. Finally, a time interval 295 between the pressing of I 208 and N 210 keys is determined, and thus the first subset of intervals between the time each key is pressed and the time all other keys are pressed is obtained.

Further, the processor 401 can be configured to determine a second subset of time intervals between the respective moments of releasing each key and releasing all the other keys. More specifically, first, the processor 401 can be configured to determine time intervals 240, 244, 248 and 252 between the first time of releasing 214 of the L 202 key and respective times of releasing the O 204, G 206, I 208 and N 210 keys. Second, the processor 401 can be configured to determine time intervals 270, 274 and 278 between the second time of releasing 218 of the O 204 key and respective moments of releasing the G 206, I 208 and N 210 keys. A time interval 240 between the time of releasing of the L 202 and O 204 keys is not determined in this case, since it has already been determined earlier. Further, the processor 401 can be configured to determine time intervals 291 and 293 between respective moments of releasing of the G 206 key and releasing the I 208 and N 210 keys. Finally, a time interval 298 between moments of releasing the I 208 and N 210 keys is determined, and thus the second subset of intervals between the respective moments when each key is released and all other keys are released is obtained.

Further, the processor 401 can be configured to determine a third subset of time intervals between respective moments of pressing each key releasing all the other keys. More specifically, first, the processor 401 can be configured to determine time intervals 224, 228, 232 and 236 between the first time of pressing 212 of the L 202 key and respective moments in time of releasing the O 204, G 206, I 208 and N 210 keys, respectively, are measured. Second, the processor 401 can be configured to determine time intervals 258, 262 and 266 between the second time of pressing 216 of the O 204 key and respective moments of releasing the G 206, I 208 and N 210. A time interval 238 between pressing the O 204 key and releasing the L 202 key is not determined in this case, since it has already been determined earlier. Further, the processor 401 can be configured to determine time intervals 284 and 288 between respective moments of pressing the G 206 key and releasing the I 208 and N 210 keys. Finally, the processor 401 can be configured to determine a time interval 296 between moments of pressing the I 208 key and releasing the N 210 key, and thus the third subset of time intervals between respective moments when each key is pressed and all other keys are released is obtained.

Further, the processor 401 can be configured to determine a fourth subset of time intervals between respective moments in time of releasing each key and pressing all the other keys. More specifically, first, the processor 401 can be configured to determine time intervals 238, 242, 246 and 250 between the first time of releasing 214 of the L 202 key and the respective times of pressing the O 204, G 206, I 208 and N 210 keys. Second, the processor 401 can be configured to determine time intervals 268, 272 and 276 between the second time of releasing 218 of the O 204 key and respective times of pressing the G 206, I 208 and N 210 keys. A time interval 224 between the time of releasing the O 204 key and the time of pressing the L 202 key is not measured in this case, since it has already been measured earlier. Further, the processor 401 can be configured to determine time intervals 290 and 292 between respective moments of releasing of the G 206 key and pressing the I 208 and N 210 keys. Finally, the processor 401 can be configured to determine a time interval 297 between moments of releasing the I 208 key and pressing the N 210 key, and thus the fourth subset of time intervals between the respective moments when each key is released and all other keys are pressed is obtained.

According to certain non-limiting embodiments of the present technology, the processor 401 can be configured to determine the set of time intervals by determining respective differences between each pair of timestamps of the system clock (timestamp), obtained upon reception of the corresponding scan codes.

The processor 401 can be configured to determine the time intervals, for example, with an accuracy of 0.01 second and expressed in decimal, hexadecimal or any other convenient format; and further save the time intervals in a specific user data set file. The sequence number of the interval may not be recorded, because it follows from the place of the measured value in the range of the remaining values of the set.

A non-limiting example of the sequence in which the processor 401 can be configured to determine and store the time intervals is given below with continued reference to FIG. 2.

At the first time of pressing 212 of the first key—which is L 202—the processor 401 can be configured to receive a first timestamp from the system clock. At the first time of releasing 214 of the L 202 key, the processor 401 may receive a second timestamp from the system clock, and the processor 401 can further be configured to determine and store the time interval 220 between the first timestamp and the second timestamps of the system clock. At the second time of pressing 216 of the O 204 key, the processor 401 can receive a third timestamp form the system clock, and the processor 401 can further be configured to determine and store the time interval 222 between the first timestamp and third timestamp and the time interval 238 between the second timestamp and third timestamp. At the second time of releasing 218 the O 204 key, the processor 401 can be configured to receive a fourth timestamp from the system clock, and the processor 401 can further be configured to determine and store the following time intervals: the time interval 224 between the first timestamp and fourth timestamp, the time interval 240 between the second timestamp and fourth timestamp, the time interval 254 between the third timestamp and fourth timestamp. As it can be appreciated, the processor 401 can be configured to determine and store other time intervals in a similar fashion.

It should be noted that when entering the user credentials on the keyboard, the user may press a "next" key before releasing a "previous" key. To that end, the time of pressing the second key 216 will be closer to the start of typing 212 than the time of releasing the first key 214. This feature of working on the keyboard may only affect a number of the corresponding time intervals (220, 222, 238, etc.). This feature of the user will not affect neither the total number of time intervals determined for the given key that make up the login and password, nor the functioning of the system that implements the claimed method. However, the fact that the determined time intervals in this case will have completely different values than for users with the usual way of typing may thus allow for greater reliability of the present technology.

In additional non-limiting embodiments of the present technology, aside from keys corresponding to the "meaningful", i.e. symbolic keys, associated with characters, the keyboard may have a number of service keys. Some of them, such as the Ctrl key, do not affect character input in the text field. Therefore, the receipt of scan codes of such keys within the scope of the present technology can be ignored. In alternative non-limiting embodiments of the present technology, the scan codes of non-symbolic keys can be processed similarly to the scan codes of the keys corresponding to characters.

Other service keys, such as Del or Backspace, are always used only when the user, typing characters, made a mistake and would like to delete the character they just entered. In this regard, given that the Backspace key deletes the character to the left of the current position of the text cursor, the receipt of the scan code of this key means that the previous character was entered incorrectly. Thus, in some non-limiting embodiments of the present technology, the processor 401 can be configure to discard time intervals associated with the key associated with the deleted character, and continue determining further time intervals, starting from the next character after Backspace, which will be considered "instead of" erroneously entered. Further, it should be noted that the Backspace scan code is ignored when determining the time intervals.

If the user presses Backspace several times, then the corresponding part of the already determined time intervals can be deleted; and all previously determined time intervals can be deleted if the number of presses on the Backspace was greater than or equal to the number of characters already entered.

Since the Del key deletes a character located to the right of the text cursor, in order to delete the last entered character with this key, the user first presses the "left arrow" service key and then Del. Therefore, the receipt of scan codes of the "left arrow" and Del keys sequentially is processed similarly to the case with the receipt of a Backspace scan-code. Also, the scan codes of the "left arrow" and Del keys are ignored when calculating the time intervals. Combinations of scan codes in the form of "X pressing the "left arrow", then X pressing Del" are processed in the same way as the situation described above, when the Backspace key is pressed X times in a row.

As the Enter key in the authorization interfaces is often used to confirm the username and password entered in the text fields, i.e. serves as the "Enter the typed username and password" command. Therefore, upon the receipt of the scan-code of the Enter key can, along with other features, the processor 401 can be configured to receive an indication that determining the time intervals is completed, and the obtained values are stored to the file.

Further, according to some non-limiting embodiments of the present technology, the processor 401 may be configured, based on the respective pluralities of time intervals, generate the training set of data associated with the user identifier of the user. It should be noted that in some embodiments, only correct entries of the user credentials are considered for the training set of data; and, in cases where the user makes a mistake in entering the user credentials, the processor 401 can be configured to cause the computer system to display a respective error message and request an additional entry of the user credentials until the entered credentials are correct.

According to certain non-limiting embodiments of the present technology, the processor 401 can be configured to generate for each instance of the predetermined number of inputting the user credentials, a respective dataset including associated sets of time intervals and store it in a database.

The method 100 hence advances to step 106.
Step 106: Determining, for a Given One of the Plurality of Time Intervals, Based on a Plurality of Instances of Inputting, by the User, the Predetermined Text, a Respective Variance Value At step (106), according to certain non-limiting embodiments of the present technology, the processor 401 can be configured to determine most stable time intervals within time intervals stored in the database over the predetermined number of instances of the user inputting the user credentials to the electronic device. In other words, the processor 401 can be configured to determine most consistent time intervals associated with the user.

For example, in some non-limiting embodiments of the present technology, for each time interval, the processor 401 can be configured to determine a respective variance value, an illustrative example of which is given below. Suppose there are 10 datasets {K} corresponding to 10 instances of inputting the user credentials by the user, wherein each dataset comprises a similar set of time intervals t(k):

{K1}={t1(1);t1(2);t1(3) ... t1(K)};

{K1}={t2(1);t2(2);t2(3) ... t2(K)};

...

{K10}={t10(1);t10(2);t10(3) ... t10(K)}.

The processor 401 can be configured to determine the respective variance value D for each time interval over {K} sets of time intervals as follows:

$$D(1)=D(\{t1(1);t2(1);t3(1);t4(1) \ldots t10(1)\});$$

$$D(2)=D(\{t1(2);t2(2);t3(2);t4(2) \ldots t10(2)\}); \ldots$$

$$D(K)=D(\{t1(K);t2(K);t3(K);t4(K) \ldots t10(K)\}).$$

According to some non-limiting embodiments of the present technology, the processor 401 can be configured to determine the respective variance value D as a variance of a random variable having values of a respective time interval over the {K} sets of time intervals.

The method 100 hence proceeds to step 108.
Step 108: Ranking, by the Processor, the Plurality of Time Intervals in Accordance with Respective Variance Values Associated Therewith, Thereby Generating a Ranked List of Time Intervals At step 108, the processor 401 can be configured to rank the time intervals determine over the predetermined number of instances of inputting the user credentials according to respective variance values associated therewith, thereby generating a ranked list of time intervals associated with the user.

The method 100 thus advances to step 110.
Step 110: Selecting, by the Processor, from the Ranked List of Time Intervals, a Predetermined Number of Top Time Intervals for Inclusion Thereof in a Training Set of Data At step 110, the processor 401 can be configured to select a predetermined top (for example, 50 or 200) number of time intervals having minimum respective variance values, thereby determining the most stable features associated with the user.

The described example of the method for selecting the most stable time intervals is non-limiting. Alternatively, any other method of feature extraction can be used, for example, one described under the following reference ru.wikipedia.org/w/index.php?title=%D0%92%D1%8B%D0%B4% D0%B5%D0%BB%D0%B5%D0%BD%D0%B8%D0% B5%D0%BF%D1%80%D0%B8%D0%B7%D0%BD% D0%B0%D 0%BA%D0%BE%D0%B2&oldid=98135923.

Thus, the processor 401 can be configured to include the predetermined number of top time intervals associated with the user in the training set of data for use thereof to train the classifier to identify the user by in-use (that is, future) instances of inputting the user credentials to the electronic device.

In additional non-limiting embodiments of the present technology, the processor 401 can be configured to assign a given one of the predetermined top time intervals may be with a respective weight value indicative of a respective operation area of the keyboard to which a key associated with the given one of the predetermined top time intervals belongs.

Figure 3:
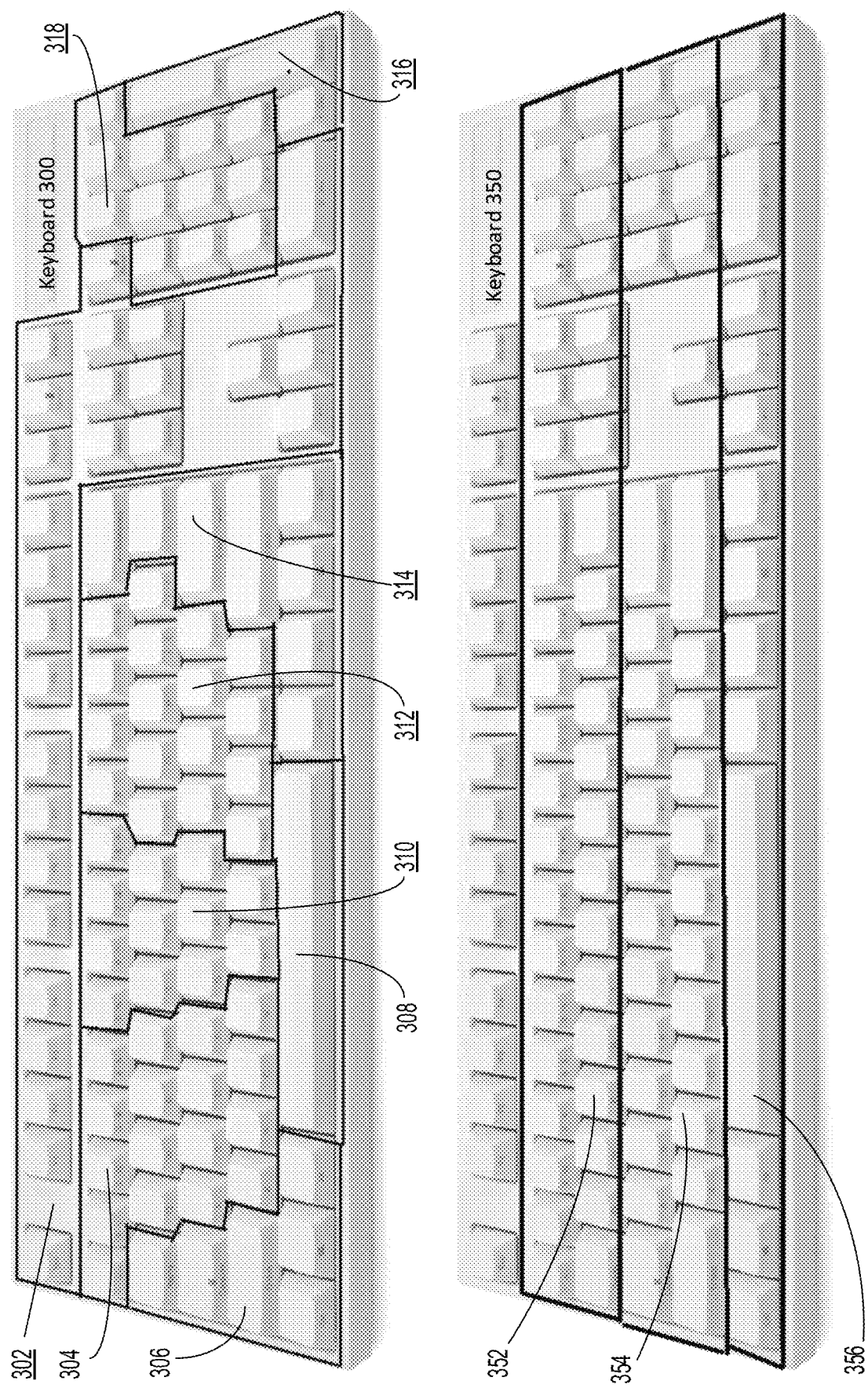
FIG. 3 depicts a schematic diagram of dividing the keyboard into zones, in accordance with certain non-limiting embodiments of the present technology.

For example, as depicted in FIG. 3, according to certain non-limiting embodiments of the present technology, a keyboard 300 may be divided into the following operation areas a service key area 302, a left area of the alphanumeric block 304, a middle area of the alphanumeric block 310, a right area of the alphanumeric block 312, a left 306 and a right 314 areas of the modifier keys, a space bar area 308, a numeric keypad area 318, and a service key area of the numeric keypad 316.

Alternatively, the keyboard, such as a keyboard 350, may be divided into an upper operation area 352, a middle operation area 354, and a lower operation area 356.

Thus, in some non-limiting embodiments of the present technology, each of the operation areas of the keyboard 300 may be preassigned with a respective weight value indicative of a multiplication factor applied to an associated time interval.

For example, considering the example of the keyboard 350, time intervals associated with keys of the upper area 352 can be multiplied by 10, time intervals associated with keys of the middle operation area 354 remain unchanged (multiplied by 1), and time intervals for keys of the lower operation area 356 are multiplied by 0.1.

Also, in some non-limiting embodiments of the present technology, where, for example, the user credentials are assigned not to one user, but to a group of users (for example, students of a same class of secondary school, students of the same study group, etc.), the processor 401 can be configured to receive the training key stroke data including data of all these users and process it, as described above with reference to steps 104 to 110 of the method 100. After determining and storing the time intervals, the processor 401 can be configured to assign the time intervals with respective user identifiers (or otherwise, a single group user identifier) of all users of the group of users. Accordingly, in these embodiments, the processor 401 can be configured to train the classifier to identify, by the in-use instances of inputting the user credentials, a given one of the group of users.

The method 100 thus proceeds to step 112.

Step 112: Training, by the Processor, Based on the Training Set of Data, the Classifier to Determine if the Predetermined Text Inputted into the Electronic Device in Future has been Inputted by the User At step 112, according to some non-limiting embodiments of the present technology, the processor 401 can be configured to train the classifier based on the so generated training set of data comprising the most stable time intervals determined in response to the user inputting the user credentials to the electronic device.

Further, the processor 401 can be configured to use the so trained classifier to determine if the user credentials in future have been entered by the user or not.

To that end, in an in-use phase, upon receiving in-use key stroke data generated in response to inputting the user credentials into the electronic device, the processor 401 can be configured to receive, form the system clock data, timestamps indicative of time of pressing and/or releasing each of the keys used for inputting the user credentials. The processor 401 may further be configured to aggregate the received timestamps in an in-use dataset.

Further, the processor 401 can be configured to apply the trained classifier to the in-use dataset to determine a likelihood parameter indicative of whether the user credentials have been inputted by the user or not. In those embodiments of the present technology, where the processor 401 was configured to train the classifier based on the training set of data of the group of users, the processor 401 can further be configured to determine a likelihood parameter indicative of whether a current one entering the user credentials belongs to the group of users.

For example, in response to the likelihood parameter being equal to or greater than a predetermined threshold value, the processor 401 can be configured to determine that the user credentials have been inputted by the user.

By contrast, in response to the likelihood parameter being lower than the predetermined threshold value, the processor 401 can be configured to determine that the user credentials have been inputted not by the user. In this example, the processor 401 can be configured to cause the computer system to generate and send a respective information message to the user.

In some non-limiting embodiments of the present technology, the classifier can be implemented, for example, as at least one of an Isolation Forest classifier and a One Class SVM classifier.

In some non-limiting embodiments of the present technology, the processor 401 can be configured to train the classifier by applying one or more methods of machine learning.

In some non-limiting embodiments of the present technology, the electronic device may be an integral part of a web site including a user authorization feature including, for example, without limitation, an online store or a portal of public services.

The method 100 thus terminates

Computer Environment

Figure 4:
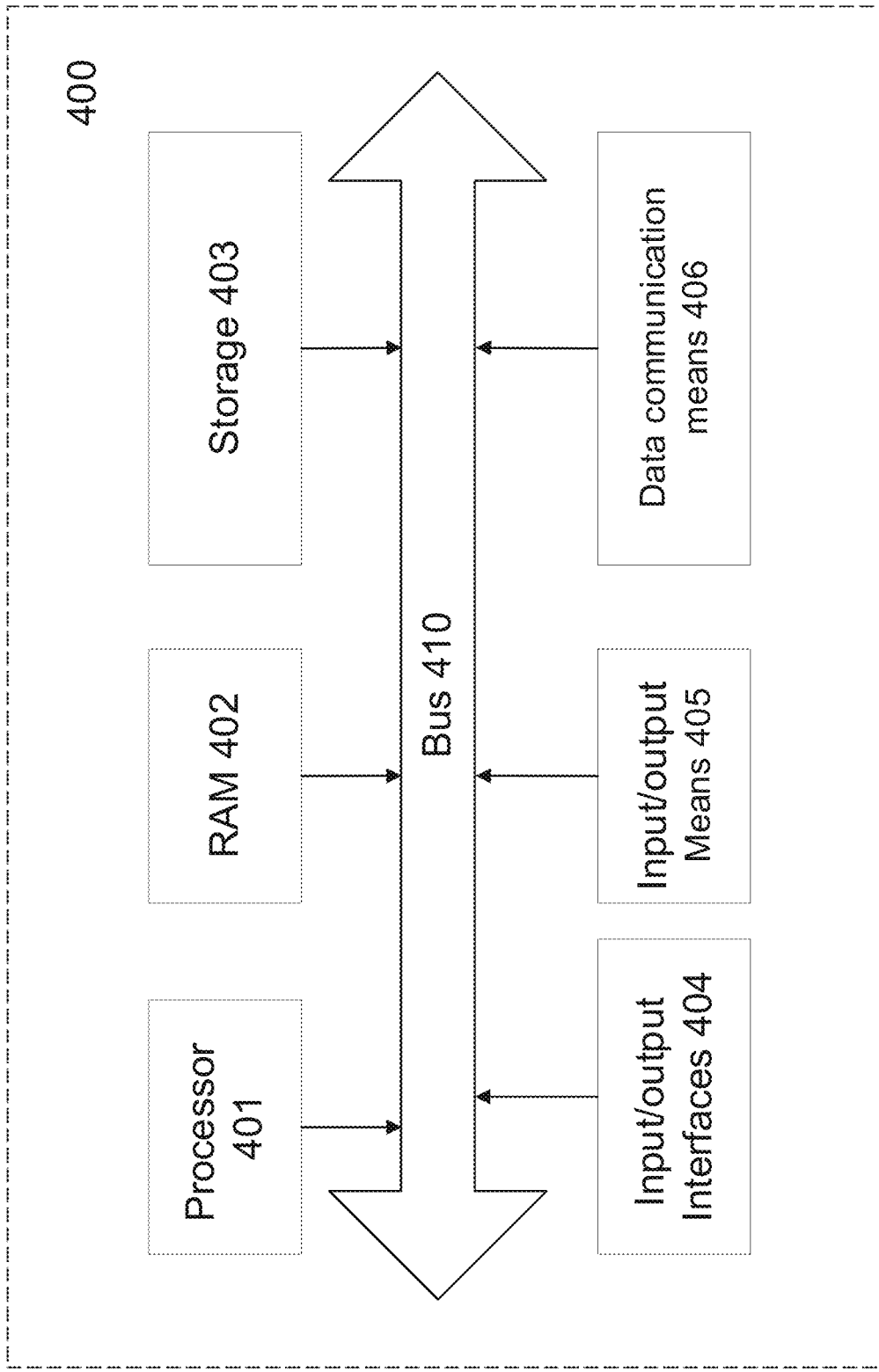
FIG. 4 depicts a schematic diagram of an example computing environment configurable for execution of the method of FIG. 1, in accordance with certain non-limiting embodiments of the present technology.

With reference to FIG. 4, there is depicted an example functional diagram of the computing environment 400 configurable to implement certain non-limiting embodiments of the present technology including the method 100 described above.

In some non-limiting embodiments of the present technology, the computing environment 400 may include: the processor 401 comprising one or more central processing units (CPUs), at least one non-transitory computer-readable memory 402 (RAM), a storage 403, input/output interfaces 404, input/output means 405, data communication means 406.

According to some non-limiting embodiments of the present technology, the processor 401 may be configured to execute specific program instructions the computations as required for the computing environment 400 to function properly or to ensure the functioning of one or more of its components. The processor 401 may further be configured to execute specific machine-readable instructions stored in the at least one non-transitory computer-readable memory 402, for example, those causing the computing environment 400 to execute the method 100.

In some non-limiting embodiments of the present technology, the machine-readable instructions representative of software components of disclosed systems may be implemented using any programming language or scripts, such as C, C++, C #, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 402 may be implemented as RAM and contains the necessary program logic to provide the requisite functionality.

The storage 403 may be implemented as at least one of an HDD drive, an SSD drive, a RAID array, a network storage, a flash memory, an optical drive (such as CD, DVD, MD, Blu-ray), etc. The storage 203 may be configured for long-term storage of various data, e.g., the aforementioned documents with user data sets, databases with the time intervals measured for each user, user IDs, etc.

The input/output interfaces 404 may comprise various interfaces, such as at least one of USB, RS232, RJ45, LPT, COM, HDMI, PS/2, Lightning, FireWire, etc.

According to the non-limiting embodiments of the present technology, the input/output means 405 include a keyboard, such as one of the keyboard 300 and the keyboard 350 depicted in FIG. 3. In certain non-limiting embodiments of the present technology, the input/output means 405 may further include at least one of a joystick, a (touchscreen) display, a projector, a touchpad, a mouse, a trackball, a stylus, speakers, a microphone, and the like. A communication link between each one of the input/output means 405 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 406 may be selected based on a particular implementation of the network, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 504 may be configured for wired and wireless data transmission, via one of WAN, PAN, LAN, Intranet, Internet, WLAN, WMAN, or GSM networks.

These and other components of the computing environment 400 may be linked together using a common data bus 410.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of training a classifier to identify a user of an electronic device including a keyboard having a plurality of keys, the method comprising:
    in a training phase:
        receiving training key stroke data associated with the user,
            a given portion of the training key stroke data having been generated in response to the user interacting with a given key of the plurality of keys used for inputting a predetermined text into the electronic device;
        determining based on the given portion of the training key stroke data, a plurality of time intervals including:
            a first time interval, during which the given key is pressed;
            a plurality of second time intervals between respective moments of pressing the given key and pressing each one of those of the plurality of keys used for inputting the predetermined text;
            a plurality of third time intervals between respective moments of releasing the given key and releasing each one of those of the plurality of keys used for inputting the predetermined text;
            a plurality of fourth time intervals between respective moments of pressing the given key and releasing each one of those of the plurality of keys used for inputting the predetermined text;
            a plurality of fifth time intervals between respective moments of releasing the given key and pressing each one of those of the plurality of keys used for inputting the predetermined text;
        determining, for a given one of the plurality of time intervals, based on a plurality of instances of inputting, by the user, the predetermined text, a respective variance value;
        ranking the plurality of time intervals in accordance with respective variance values associated therewith, thereby generating a ranked list of time intervals;
        selecting from the ranked list of time intervals, a predetermined number of top time intervals having minimum respective variance values for inclusion in a training set of data;
            the predetermined number of top time intervals being associated with a user identifier indicative of an association between the predetermined number of top time intervals and the user; and
        training based on the training set of data, the classifier to determine if the predetermined text inputted into the electronic device in future has been inputted by the user.

2. The method of claim 1, further comprising using the classifier, by executing, in an in-use phase following the training phase:
    receiving in-use key stroke data, each portion of the in-use key stroke data having been generated in response to interacting with a respective key of the plurality of keys used for inputting the predetermined text into the electronic device;
    receiving, for each portion of the in-use key stroke data, a respective timestamp indicative of a time of generating a respective portion of the in-use key stroke data;
    aggregating each portion of the in-use key stroke data with the respective timestamp, thereby generating an in-use set of data; and
    applying the classifier to the in-use set of data to determine a likelihood parameter indicative of whether the predetermined text has been inputted by the user or not, and wherein the method further comprises:
        in response to the likelihood parameter being equal to or greater than a predetermined threshold value, determining that the predetermined text has been inputted by the user; and
        in response to the likelihood parameter being lower than the predetermined threshold value, determining that the predetermined text has been inputted not by the user.

3. The method of claim 2, wherein in response to the determining that the predetermined text has been inputted not by the user, the method further comprises generating a predetermined message.

4. The method of claim 1, wherein the given one of the plurality of keys is a non-symbolic key used during the inputting the predetermined text.

5. The method of claim 1, wherein the keyboard is divided into predetermined operation areas, each of which includes a respective sub-plurality of keys of the plurality of keys.

6. The method of claim 5, wherein each of the predetermined operation areas of the keyboard is associated with a respective predetermined weight value assigned to each one of the respective sub-plurality of keys including the given key, and the method further comprises:
    assigning the respective predetermined weight value to each one of the plurality of time intervals.

7. The method of claim 1, wherein the training the classifier includes applying one or more machine learning algorithms.

8. The method of claim 1, wherein the user comprises a plurality of users, and the given one of the plurality time intervals is associated with a group user identifier indicative of an association between the given one of the plurality time intervals and each one of the plurality of users.

9. An electronic device for training a classifier to identify a user of the electronic device having a keyboard including a plurality of keys, the electronic device comprising:
at least one processor;
at least one non-transitory computer-readable medium comprising instructions, which, when executed by the at least one processor, cause the electronic device to:
in a training phase:
receive training key stroke data associated with the user,
a given portion of the training key stroke data having been generated in response to the user interacting with a given key of the plurality of keys used for inputting a predetermined text into the electronic device;
determine, based on the given portion of the training key stroke data, a plurality of time intervals including:
a first time interval, during which the given key is pressed;
a plurality of second time intervals between respective moments of pressing the given key and pressing each one of those of the plurality of keys used for inputting the predetermined text;
a plurality of third time intervals between respective moments of releasing the given key and releasing each one of those of the plurality of keys used for inputting the predetermined text;
a plurality of fourth time intervals between respective moments of pressing the given key and releasing each one of those of the plurality of keys used for inputting the predetermined text;
a plurality of fifth time intervals between respective moments of releasing the given key and pressing each one of those of the plurality of keys used for inputting the predetermined text;
determine, for a given one of the plurality of time intervals, based on a plurality of instances of inputting, by the user, the predetermined text, a respective variance value;
rank, by the processor, the plurality of time intervals in accordance with respective variance values associated therewith, thereby generating a ranked list of time intervals;
select, from the ranked list of time intervals, a predetermined number of top time intervals having minimum respective variance values for inclusion in a training set of data;
the predetermined number of top time intervals being associated with a user identifier indicative of an association between the predetermined number of top time intervals and the user; and
train, based on the training set of data, the classifier to determine if the predetermined text inputted into the electronic device in future has been inputted by the user.

10. The electronic device of claim 9, wherein the at least one processor further causes the electronic device to use the classifier, by executing, in an in-use phase following the training phase:
receiving in-use key stroke data, each portion of the in-use key stroke data having been generated in response to interacting with a respective key of the plurality of keys used for inputting the predetermined text into the electronic device;
receiving, for each portion of the in-use key stroke data, a respective timestamp indicative of a time of generating a respective portion of the in-use key stroke data;
aggregating each portion of the in-use key stroke data with the respective timestamp, thereby generating an in-use set of data; and
applying the classifier to the in-use set of data to determine a likelihood parameter indicative of whether the predetermined text has been inputted by the user or not, and wherein the at least one processor further causes the electronic device to execute:
in response to the likelihood parameter being equal to or greater than a predetermined threshold value, determining that the predetermined text has been inputted by the user; and
in response to the likelihood parameter being lower than the predetermined threshold value, determining that the predetermined text has been inputted not by the user.

11. The electronic device of claim 10, wherein in response to the determining that the predetermined text has been inputted not by the user, the at least one processor further causes the electronic device to generate a predetermined message.

12. The electronic device of claim 9, wherein the given one of the plurality of keys is a non-symbolic key used during the inputting the predetermined text.

13. The electronic device of claim 9, wherein the keyboard is divided into predetermined operation areas, each of which includes a respective sub-plurality of keys of the plurality of keys.

14. The electronic device of claim 13, wherein each of the predetermined operation areas of the keyboard is associated with a respective predetermined weight value assigned to each one of the respective sub-plurality of keys including the given key, and the at least one processor further causes the electronic device to:
assign the respective predetermined weight value to each one of the plurality of time intervals.

15. The electronic device of claim 11, wherein to train the classifier, the at least one processor causes the electronic device to apply one or more machine learning algorithms.

16. The electronic device of claim 11, wherein the user comprises a plurality of users, and the training set of data is associated with a group user identifier indicative of an association between the training set of data and the plurality of users.

* * * * *